United States Patent
Junker et al.

(10) Patent No.: US 9,933,040 B2
(45) Date of Patent: Apr. 3, 2018

(54) HYBRID CHAIN TIMING BELT

(71) Applicant: BorgWarner Inc., Auburn Hills, MI (US)

(72) Inventors: Matthew E. Junker, Cortland, NY (US); Dean R. Russo, Dryden, NY (US); Daniel L. Ackler, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/116,002

(22) PCT Filed: Feb. 5, 2015

(86) PCT No.: PCT/US2015/014536
§ 371 (c)(1),
(2) Date: Aug. 2, 2016

(87) PCT Pub. No.: WO2015/120105
PCT Pub. Date: Aug. 13, 2015

(65) Prior Publication Data
US 2017/0167570 A1    Jun. 15, 2017

Related U.S. Application Data

(60) Provisional application No. 61/936,567, filed on Feb. 6, 2014, provisional application No. 62/101,140, filed on Jan. 8, 2015.

(51) Int. Cl.
*F16G 1/12* (2006.01)
*F16G 1/28* (2006.01)
*F16H 7/02* (2006.01)
*F16H 7/08* (2006.01)

(52) U.S. Cl.
CPC .................. *F16G 1/12* (2013.01); *F16G 1/28* (2013.01); *F16H 7/023* (2013.01); *F16H 7/08* (2013.01); *F16H 2007/0872* (2013.01)

(58) Field of Classification Search
CPC ... F16G 1/12; F16G 1/28; F16H 7/023; F16H 7/08; F16H 2007/0872
See application file for complete search history.

(56) References Cited

U.S. PATENT DOCUMENTS

| 1,007,569 | A | 10/1911 | Holsman |
| 2,113,790 | A | 4/1938 | Judelshon |
| 2,224,068 | A | 12/1940 | Togel |
| 2,555,190 | A | 5/1951 | Fuchslocher |

(Continued)

FOREIGN PATENT DOCUMENTS

| CN | 2351613 Y | 12/1999 |
| DE | 3324799 A1 | 2/1985 |

(Continued)

OTHER PUBLICATIONS

International Search Report for PCT/US2015/014536 with mailing date of May 13, 2015.

(Continued)

*Primary Examiner* — William E Dondero
*Assistant Examiner* — Robert T Reese
(74) *Attorney, Agent, or Firm* — Brown & Michaels, PC

(57) ABSTRACT

A hybrid chain belt which includes a toothed rubber belt and a pair of chains comprising a plurality of interleaved or laced sets of inner chain links and a plurality of interleaved outer or external links immediately adjacent the inner links mounted to the sides of the toothed belt. Each of the inner links and outer links has a pair of spaced apertures for receiving at least one pin which passes through the apertures of the links. The pins extend through the teeth of the rubber belt. Alternatively, the pair of chains may be replaced with outer links with either two apertures or a single aperture.

12 Claims, 12 Drawing Sheets

(56) References Cited

U.S. PATENT DOCUMENTS

| | | | |
|---|---|---|---|
| 2,645,132 A | | 7/1953 | Fuchslocher |
| 3,673,883 A | * | 7/1972 | Adams ................. B29D 29/085 |
| | | | 156/138 |
| 4,283,184 A | | 8/1981 | Berg |
| 4,786,273 A | | 11/1988 | Guskov et al. |
| 4,861,403 A | * | 8/1989 | Yoshimi .................... F16G 1/28 |
| | | | 156/138 |
| 9,322,455 B2 | | 4/2016 | Di Meco et al. |
| 2004/0048709 A1 | | 3/2004 | Knutson |
| 2004/0097309 A1 | | 5/2004 | Kirstein |
| 2006/0276286 A1 | | 12/2006 | Mott et al. |
| 2012/0157251 A1 | | 6/2012 | Di Meco et al. |

FOREIGN PATENT DOCUMENTS

| | | |
|---|---|---|
| DE | 3347957 C2 | 2/1988 |
| DE | 29704065 U1 | 5/1997 |
| FR | 2482231 A1 | 11/1981 |
| GB | 196294 A | 5/1924 |
| JP | 59-127946 U | 8/1984 |
| JP | S59137441 U | 9/1984 |
| JP | 61123243 U | 8/1986 |
| JP | 2002349637 A | 12/2002 |
| JP | 2012522953 A | 9/2012 |
| SE | 113793 C1 | 4/1945 |

OTHER PUBLICATIONS

Extended European Search Report for PCT/US2015014536 dated Jan. 1, 2018.

* cited by examiner

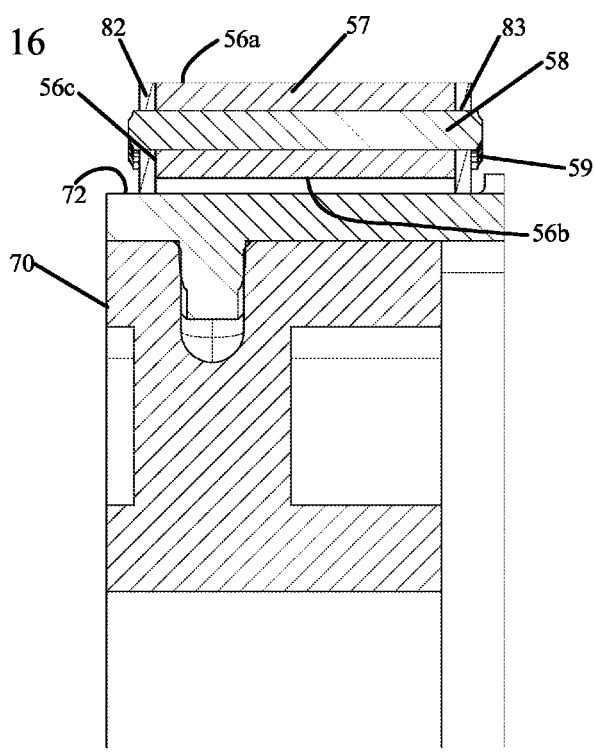
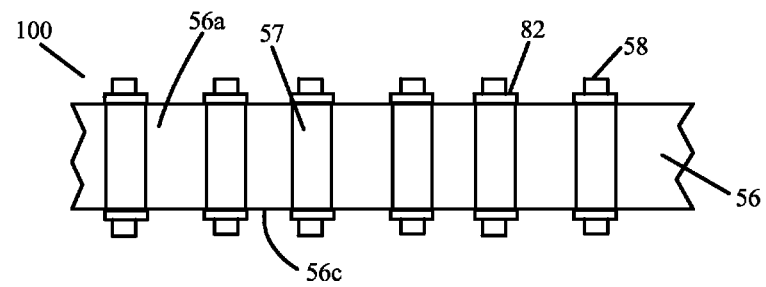

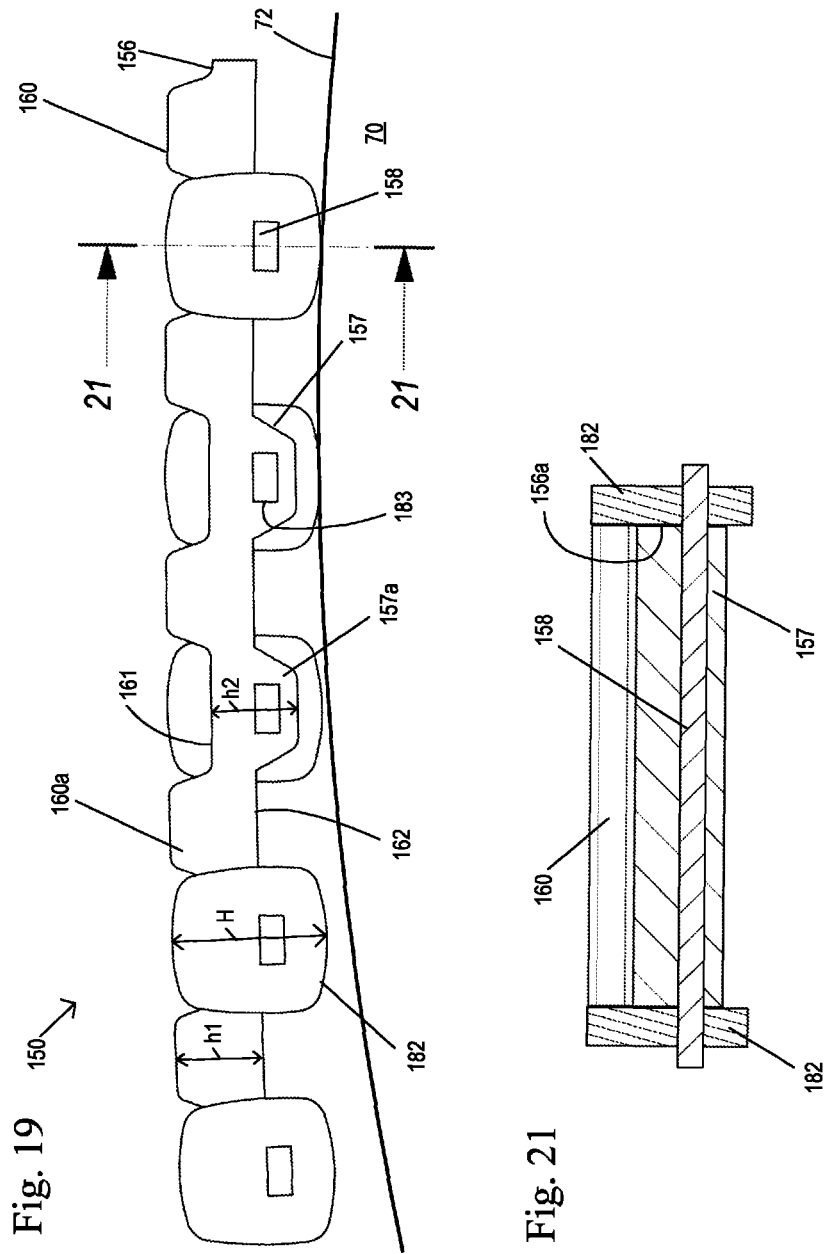

HYBRID CHAIN TIMING BELT

BACKGROUND OF THE INVENTION

Field of the Invention

The invention pertains to the field of timing belts and chains. More particularly, the invention pertains to a combined timing belt and timing chain.

Description of Related Art

A timing belt or chain synchronizes the rotation of the crankshaft and the camshaft in an internal combustion engine so that the engine's valves open and close at the proper times during each cylinder's intake and exhaust strokes.

Timing belts are generally thought to have a quiet and efficient operation.

Additionally, they are not known to be sensitive to contaminated oil. In a typical belt system there is a tensioning system which utilizes pulleys and bearings to guide the path of the belt and provide tension. These components do an adequate job, but they have the disadvantage of being heavy, high cost, and add parasitic loss to the system. The disadvantages to belts are their width, which required additional package space and their very abrupt failure mode which involves the belt breaking.

Timing chains are known for their high strength and long durability but some timing chains generate mechanical noise which is adverse to users. The tensioning system typically used on modern automotive chain timing systems involves the use of lightweight plastic arm and guides in which the chain moves across the surface of the plastic on an oil film resulting in a very low friction interface with corresponding very low parasitic losses. Additionally, with recent engine technology such as direct fuel injection and turbocharging, the engine oil has become more aggressive towards the chain due to contamination. This has raised questions with regards to chain wear durability.

Historically, a timing belt was not able to use a timing chain tensioning system as the materials used in belt construction were not compatible with motor oil. Recent technology advances in belt material technology have allowed a belt to be run in an environment of motor oil just like engine timing chains. Attempts were made to run a flat back belt on the surface of arms and guides used for a chain which resulted in excessive parasitic losses due to the high surface area of the belt.

There have been some chains and belts that attempt to use a combination of a chain and a belt. For example, British patent application GB 196294, which discloses a belt with outer link plates, inner link plates, sleeves and leather or belt strips. The inner link plates are connected to one another by a hard sleeve that surrounds the belt strips. The leather strips are higher than the outer link plates and the inner link plates so that the pulley is only engaged by the leather strip. The outer link plates are connected to each other by rivets, with the sleeves and the rivets forming the links of the chain. The sleeves and the rivets take both the pulling and bending strains.

U.S. Pat. No. 2,645,132 discloses a V-belt with wire chain links on either side of the upper portion of the V-belt, with connecting bars of the wire chain links passing through holes in the upper portion of the V-belt.

German patent DE 33 47 957 C2 discloses a double stranded belt with rigid teeth connected by pins. Pins and lugs pass through the centers of the double stranded belt.

Most of the other combinations present the chain within an interior of a belt. For example, U.S. Pat. No. 2,113,790 discloses a chain that has two flexible drive belts present on the outside of the chain. U.S. Pat. No. 2,555,190 discloses a V-belt with a wire chain within the belt to reinforce the V-belt. U.S. Pat. No. 2,224,068 discloses a chain surrounded by V-belts on either side. Swedish application SE 113793 discloses a belt with a rubber body with a core of a roller chain.

SUMMARY OF THE INVENTION

In one embodiment, a hybrid chain belt includes a toothed rubber belt and a pair of chains comprising a plurality of interleaved or laced sets of inner chain links and a plurality of interleaved outer or external links immediately adjacent the inner links mounted to the sides of the toothed belt. Each of the inner links and outer links has a pair of spaced apertures for receiving at least one pin which passes through the apertures of the links. The pins extend through the teeth of the rubber belt.

In an alternative embodiment, a hybrid chain belt includes a toothed rubber belt and outer links immediately adjacent the sides of the toothed belt. The outer links each have a pair of spaced apertures for receiving at least one pin which passes through the apertures of the links. The pins extend through the teeth of the rubber belt. The height of the outer links is greater than the height of the toothed rubber belt, elevating the toothed belt such that the outer links slide on the sliding surface of a guide or tensioner arm.

In another embodiment, a hybrid chain belt includes a toothed rubber belt and outer plates immediately adjacent the sides of the toothed belt. An outer plate is preferably present for each tooth of the toothed rubber belt. The outer plates each have a single aperture for receiving at least one pin which passes through the apertures of the plates. The pins extend through the teeth of the rubber belt. The height of the outer plates is greater than the height of the toothed rubber belt, elevating the toothed belt such that the outer plates slide on the sliding surface of a guide or tensioner arm.

In another embodiment, a hybrid chain belt includes a double sided toothed rubber belt and outer plates immediately adjacent the sides of the toothed belt. An outer plate is preferably present for each tooth extending from one side of the double sided toothed rubber belt. The outer plates each have a single aperture for receiving at least one pin which passes through the apertures of the plates. The pins extend through the teeth of the rubber belt. The height of the outer plates is greater than the height of the toothed rubber belt, elevating the toothed belt such that the outer plates slide on the sliding surface of a guide or tensioner arm.

BRIEF DESCRIPTION OF THE DRAWING

FIG. 12 shows a bottom view of the hybrid chain belt of the second embodiment with the rivets removed.

FIG. 16 shows a sectional view along line 16-16 of FIG. 14 of the hybrid chain belt engaging the sliding surface of a tensioner arm or guide.

FIG. 17 shows a top view of the hybrid chain belt of the third embodiment with the rivets removed.

FIG. 19 shows a side view of a hybrid chain belt of a fourth embodiment engaging a sliding surface of a tensioner arm or guide.

FIG. 21 shows a sectional view along line 21-21 of FIG. 19 of the hybrid chain belt of the fourth embodiment.

DETAILED DESCRIPTION OF THE INVENTION

Figure 1:
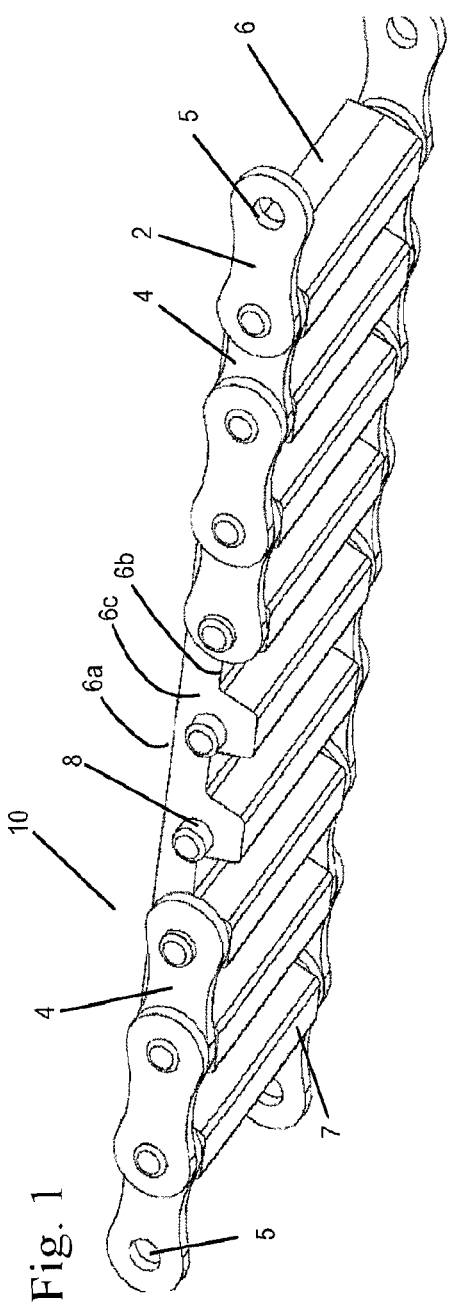
FIG. 1 shows a schematic of a hybrid timing chain-belt of a first embodiment for use in a timing drive of an internal combustion engine
Figure 2:
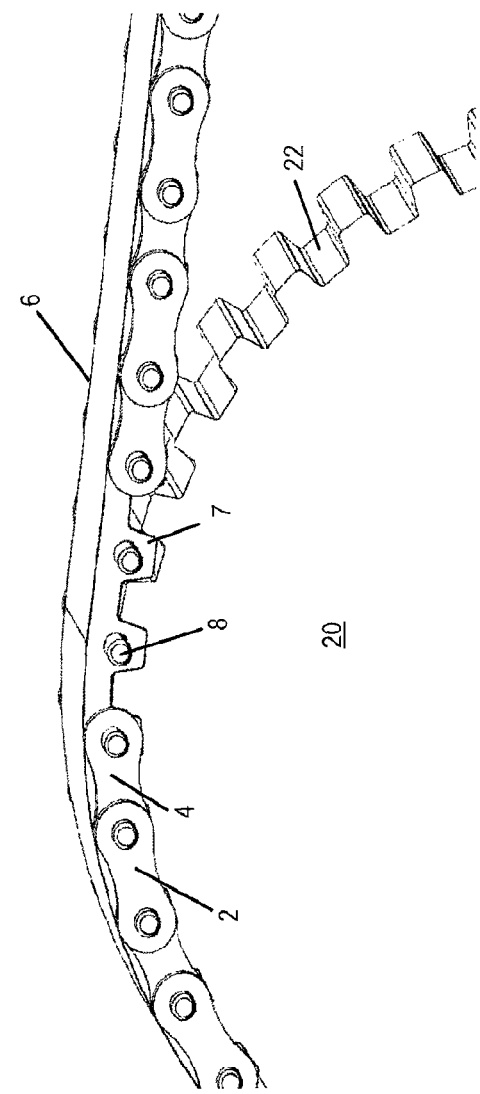
FIG. 2 shows a schematic of a hybrid chain belt engaging a toothed sprocket.
Figure 3:
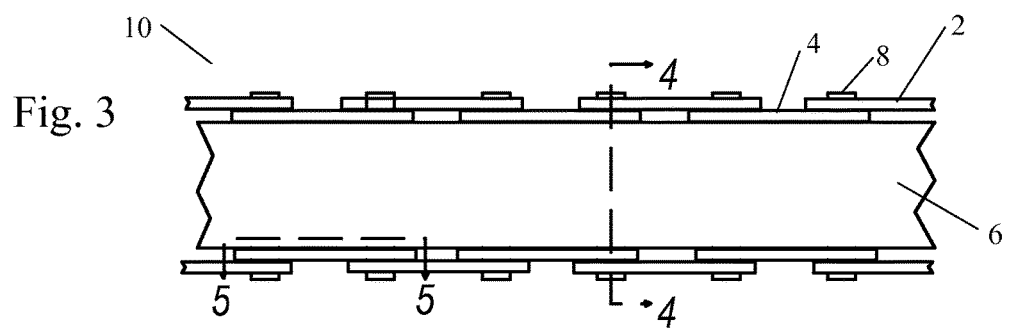
FIG. 3 shows a top view of a hybrid chain belt.

FIGS. 1 and 3-6 show a hybrid timing chain-belt of a first embodiment of the present invention for use in a timing drive of an internal combustion engine. FIG. 2 shows the hybrid timing chain-belt of a first embodiment engaging a toothed sprocket.

The hybrid timing chain-belt 10 comprises a toothed belt 6. The toothed belt 6 contains reinforcing cords (not shown) and is preferably made of rubber, elastomer, or some other material that is compatible with motor oil. The toothed belt 6 has a top surface 6a, a bottom surface 6b from which teeth 7 extend, and two identical side surfaces 6c. Extending from a bottom surface 6b of the toothed belt 6 are teeth 7. Within each of the teeth 7 of the toothed belt 6 is at least one pin 8. The pins 8 may be overmolded during the manufacturing of the toothed belt 6 or inserted into the teeth 7 of the toothed belt 6 using other techniques. The pins 8 may be retained within the teeth 7 of the toothed belt 6 using a knurled pattern, cross-drilled holes or other retention means. It should be noted that while only one pin 8 is shown, multiple pins of varying shapes and sizes may be used within the teeth 7 of the toothed belt 6.

A pair of chains comprising a plurality of interleaved or laced sets of inner chain links 4 and a plurality of interleaved outer or external links 2 immediately adjacent the inner links 4, are mounted to the sides 6c of the toothed belt 6. Each of the inner links 4 and outer links 2 has a pair of spaced apertures 5 for receiving at least one pin 8 which passes through the apertures 5 of the links. The pin apertures 5 of the outer links are aligned with the pin apertures 5 of the inner links 4 and receive at least one pin 8. The pins 8 are fixedly attached to the outer links 2.

Figure 4:
FIG. 4 shows a section view along line 4-4 of FIG. 3.

The pins 8 extend through the apertures 5 of the inner link 4 and the outer link 2 on a first side surface 6c of the toothed belt 6, through the toothed belt 6, through the second side surface 6c of the toothed belt 6 and through the apertures 5 of the internal and external links 2, 4 on the second side surface 6c as shown in FIG. 4.

The addition of the chain links 2, 4 and pins 8 to the toothed belt 6 provides increased tensile strength and enhances the durability of the toothed belt 6.

The chain-belt 10 articulates around the sprocket 20, with the teeth 7 of the toothed belt 6 engaging the sprocket teeth 22 of the sprocket. Timing drive load is carried by the toothed belt 6 of the chain-belt 10 except for when timing drive loads become very high or when the reinforcing cords of the toothed belt 6 has started to degrade in strength. The internal chain links 4 and external chain links 2 provide additional tensile load capability when the timing drive loads become high. It should be noted that the internal and external links do not engage the sprocket teeth 22.

The chain links are preferably made of metal.

Figure 5:
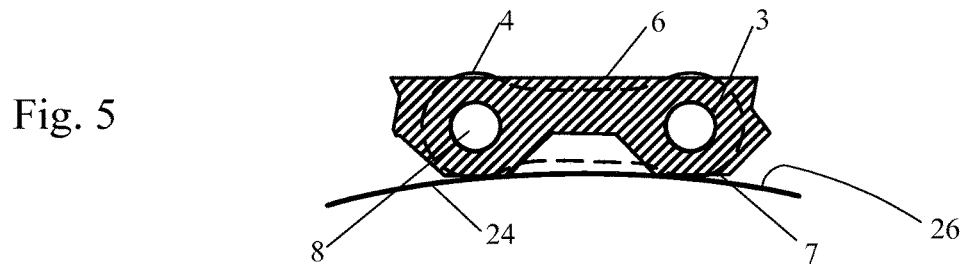
FIG. 5 shows a section view along line 5-5 of FIG. 3 with the links engaging a sliding surface of tensioner arm or guide.
Figure 6:
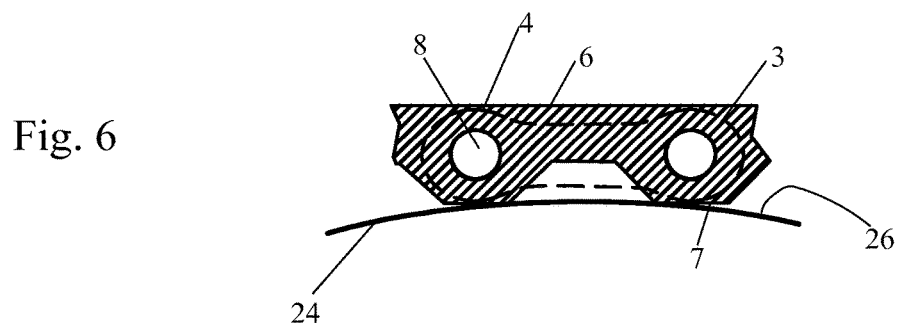
FIG. 6 shows a section view of the hybrid chain belt with the belt engaging a sliding surface of tensioner arm or guide.
Figure 7:
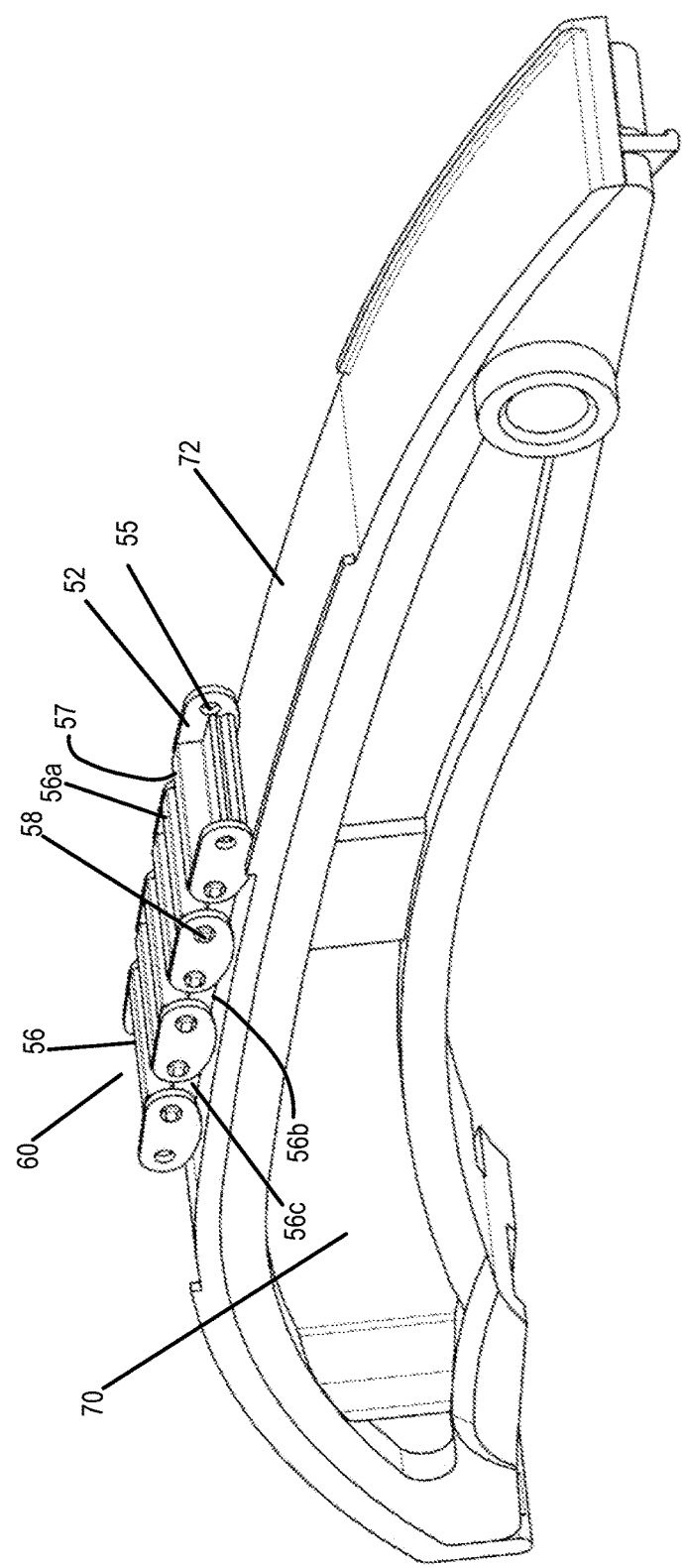
FIG. 7 shows a view of a hybrid chain belt of a second embodiment engaging a sliding surface of a tensioner arm or guide.
Figure 8:
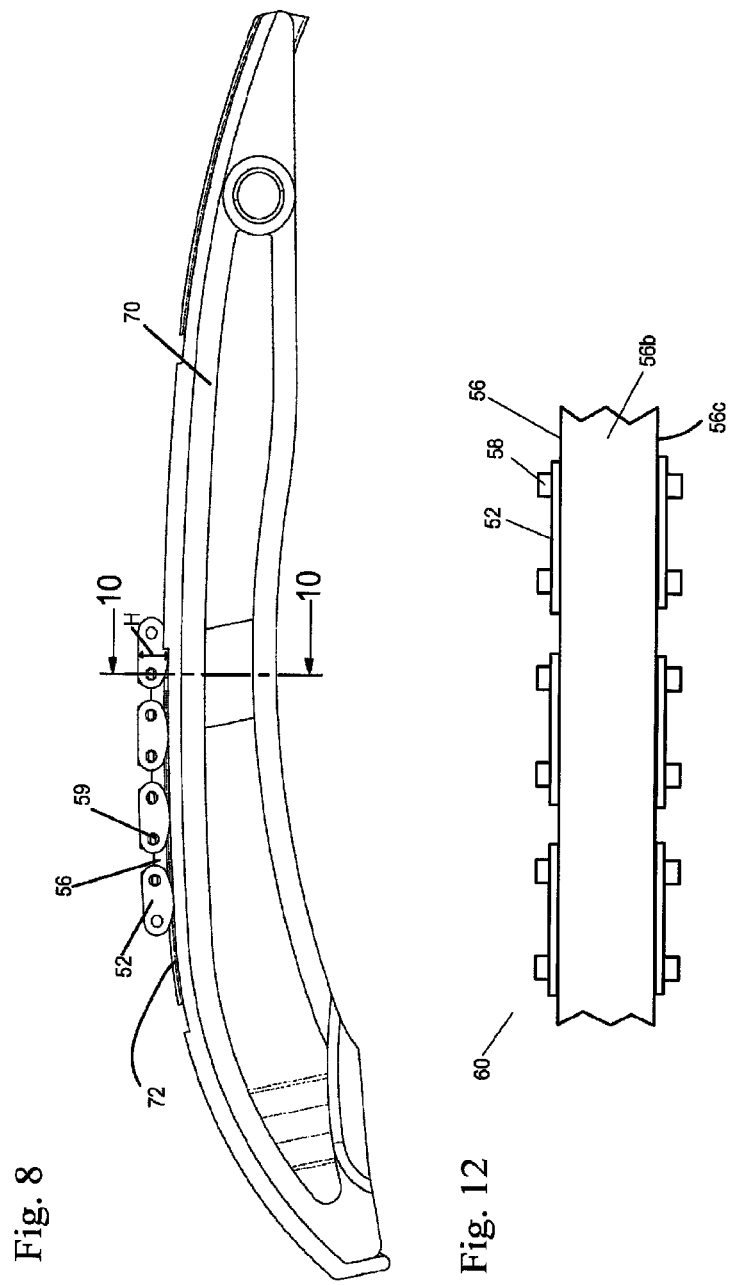
FIG. 8 shows a side view of the hybrid chain belt engaging the sliding surface of a tensioner arm or guide.
Figure 9:
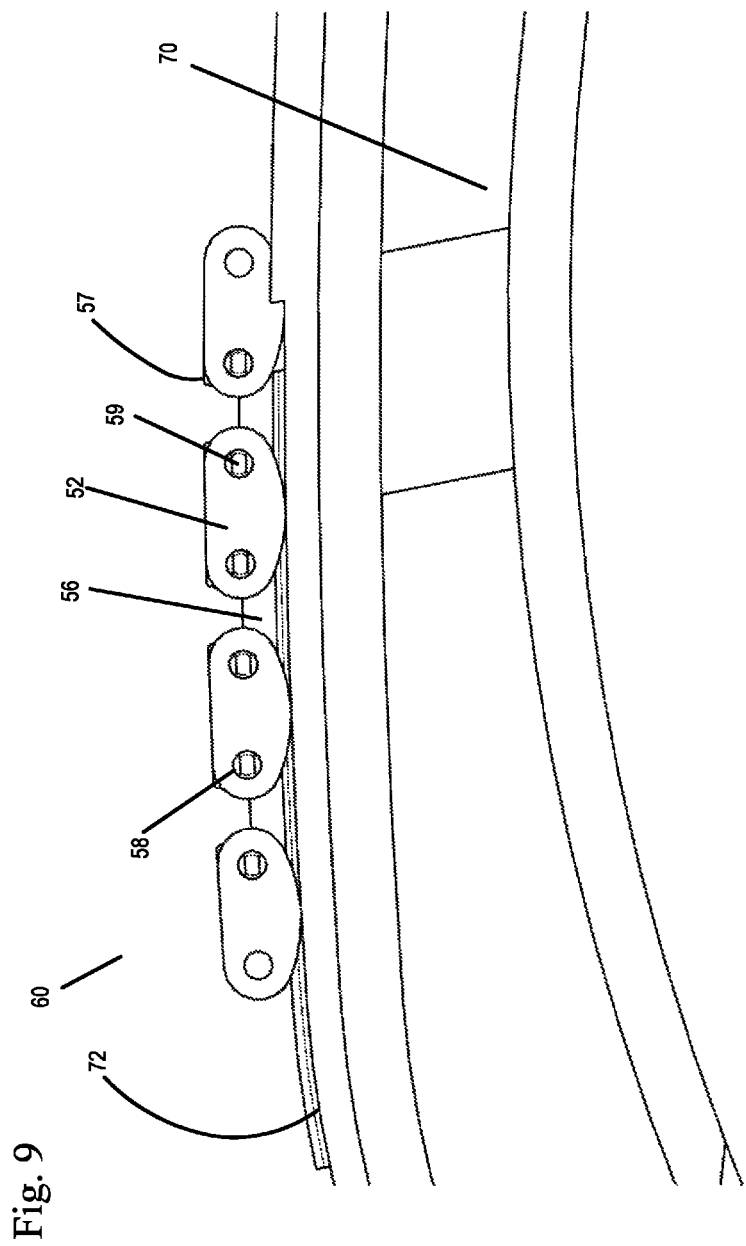
FIG. 9 shows an enlarged side view of the hybrid chain belt engaging the sliding surface of a tensioner arm or guide.
Figure 10:
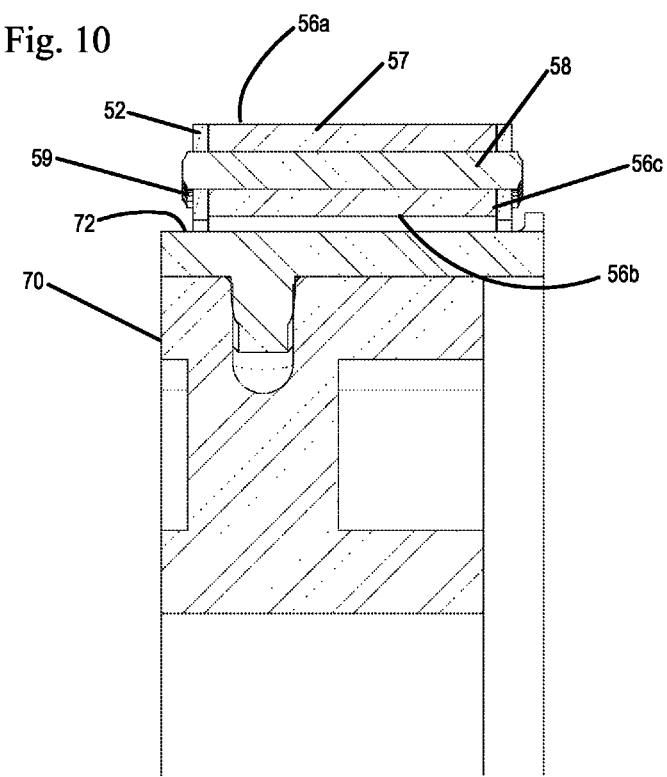
FIG. 10 shows a sectional view along line 10-10 of FIG. 8 of the hybrid chain belt engaging the sliding surface of a tensioner arm or guide.
Figure 11:
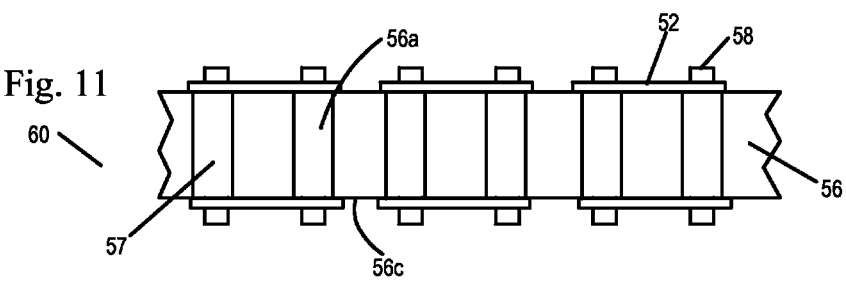
FIG. 11 shows a top view of the hybrid chain belt of the second embodiment with the rivets removed.
Figure 13:
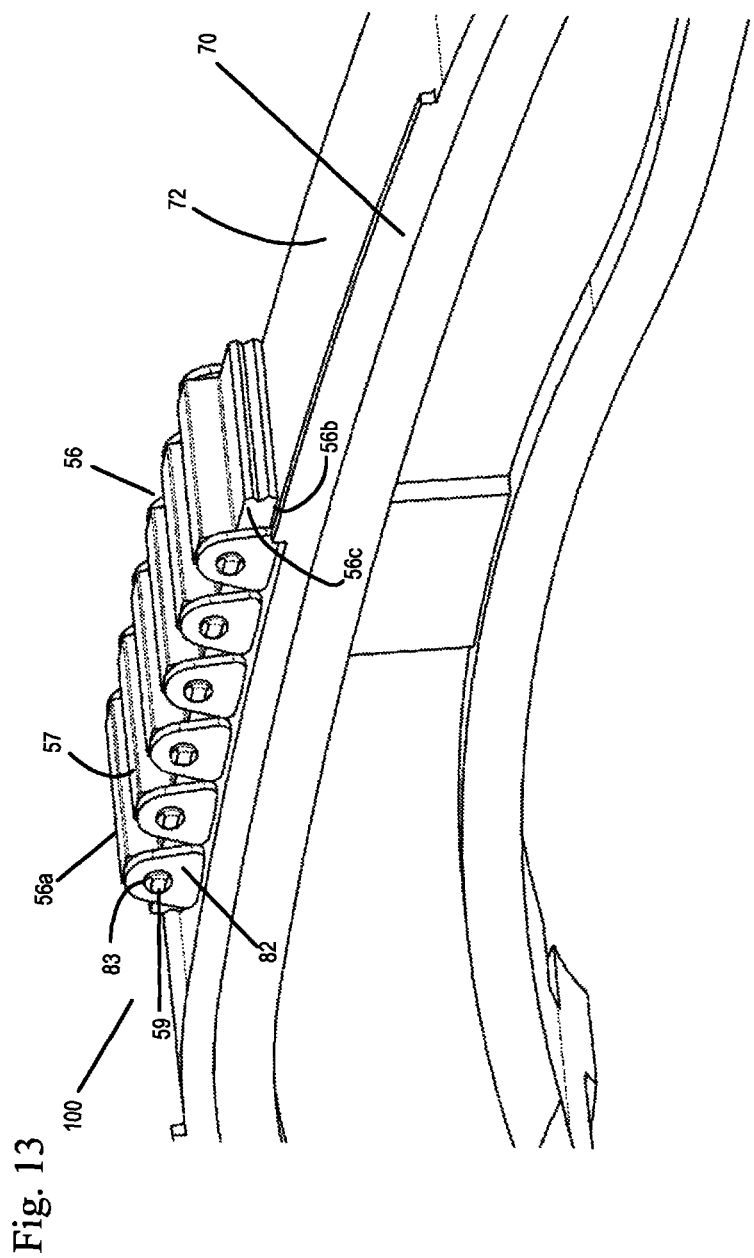
FIG. 13 shows a view of a hybrid chain belt of a third embodiment engaging a sliding surface of a tensioner arm or guide.
Figure 14:
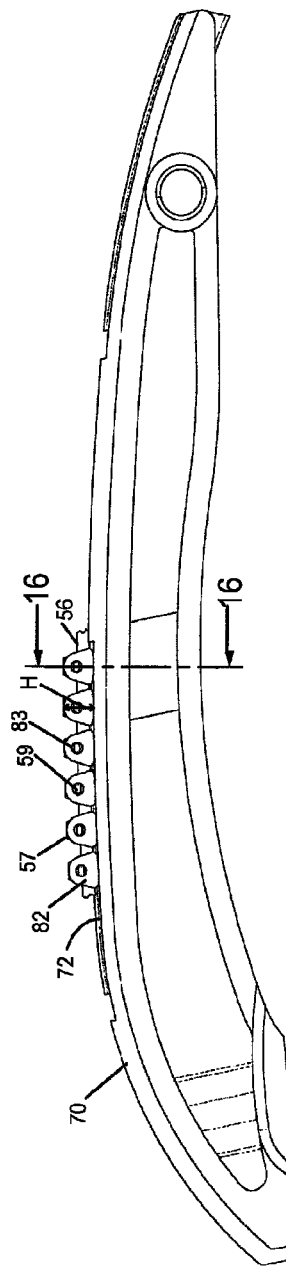
FIG. 14 shows a side view of the hybrid chain belt engaging the sliding surface of a tensioner arm or guide.
Figure 18:
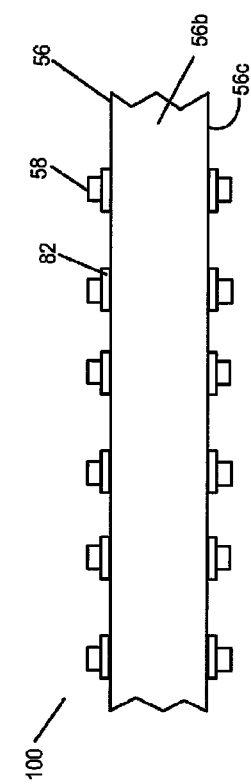
FIG. 18 shows a bottom view of the hybrid chain belt of the third embodiment with the rivets removed.
Figure 15:
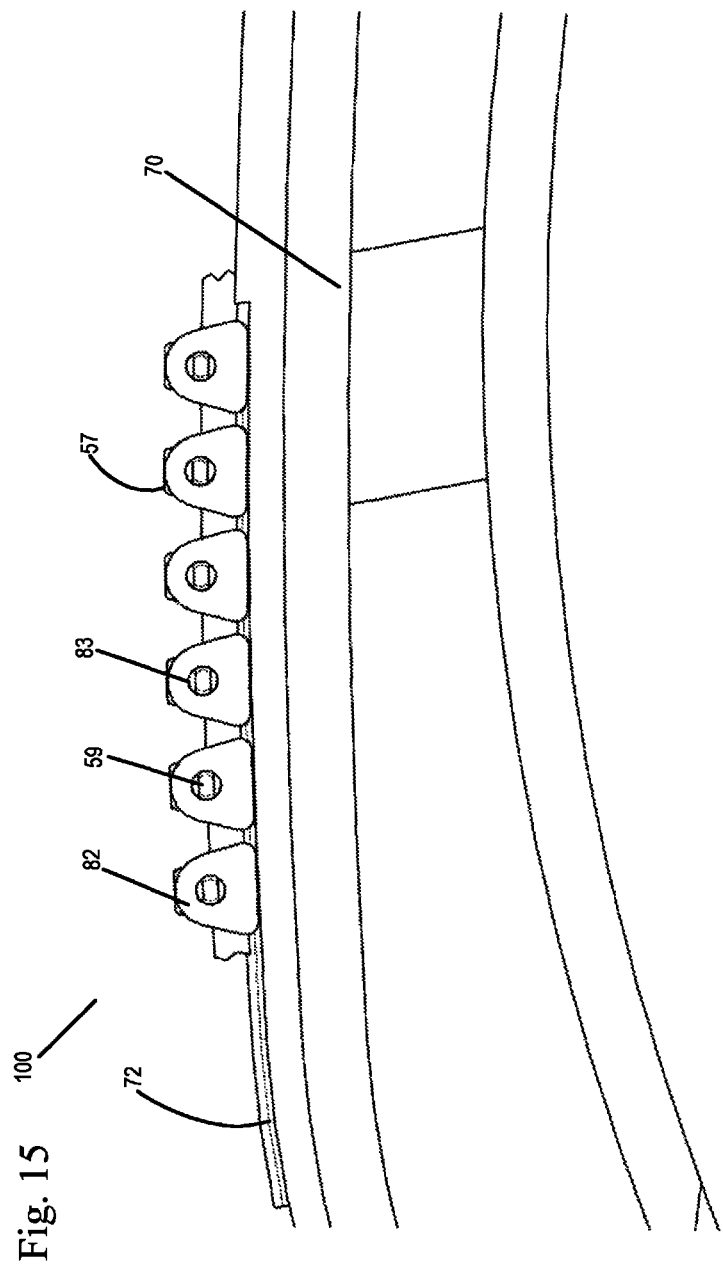
FIG. 15 shows an enlarged side view of the hybrid chain belt engaging the sliding surface of a tensioner arm or guide.
Figure 20:
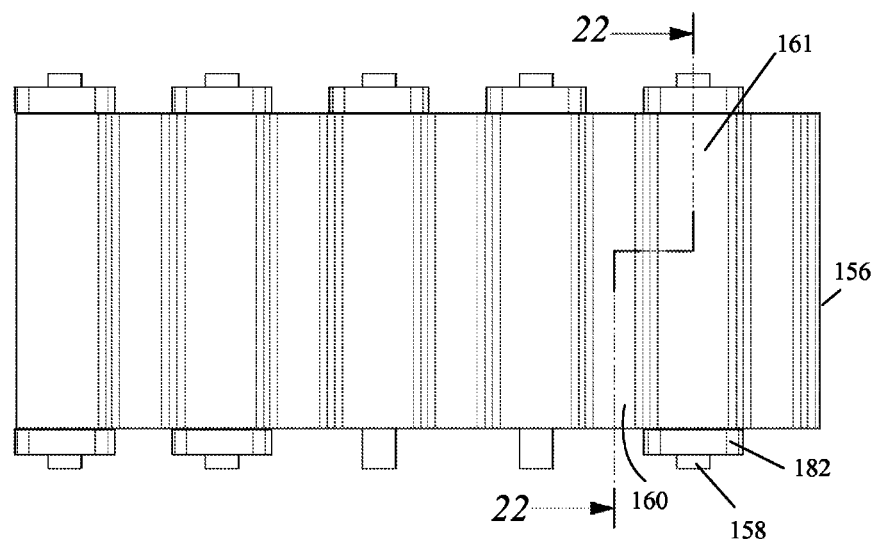
FIG. 20 shows a top view of the hybrid chain belt of the fourth embodiment.
Figure 22:
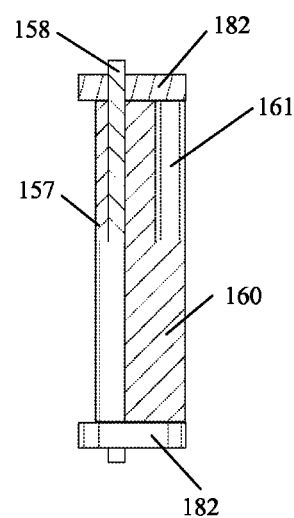
FIG. 22 shows a sectional view along line 22-22 of FIG. 20 of the hybrid chain belt of the fourth embodiment.

The hybrid chain belt can be supported or guided by one or more guides or tensioners 24, as is known to the art. In FIG. 5, the back-height of the links 2, 4 is slightly higher than the length of the teeth 7 on the toothed belt 6, so it is the links 2, 4 which ride on a guide surface 26. In some applications it may be preferred to have the belt contact the guide surface as shown in FIG. 6, where the back-height of the links 2, 4 is smaller, so that it is the teeth 7 of the belt 6 which contact the guide surface 26 of the guide or tensioner 24 instead of the links 2, 4.

FIGS. 7-12 show a hybrid chain belt of a second embodiment engaging a sliding surface of a tensioner arm or guide.

The hybrid chain belt 60 comprises a toothed belt 56. The toothed belt 56 contains reinforcing cords (not shown) and is preferably made of rubber, elastomer, or some other material that is compatible with motor oil. The toothed belt 56 has a top surface 56a with teeth 57, a bottom surface 56b, and two identical side surfaces 56c. Extending from a bottom surface 56b of the toothed belt 56 are teeth 57 which extend therefrom. Within each of the teeth 57 of the toothed belt 56 is at least one pin 58. The pins 58 may be overmolded during the manufacturing of the toothed belt 56 or inserted into the teeth 57 of the toothed belt 56 using other techniques. The pins 58 may also be inserted into a keyway present in the teeth 57. The pins 58 may be retained within the teeth 57 of the toothed belt 56 using a knurled pattern, cross-drilled holes or other retention means. It should be noted that while only one pin 58 is shown, multiple pins of varying shapes and sizes may be used within the teeth 57 of the toothed belt 56.

Outer or external links 52 are mounted to the sides 56c of the belt 56. The outer links 52 each have a pair of spaced apertures 55 for receiving at least one pin 58 which passes through the apertures 55 of the links. The outer links 52 connect at least two pins 58 together. The pins 58 are fixedly attached to the outer links 52. A rivet 59 may be present on at least one end of the pin 58 and is preferably square in shape. The pin 58 is preferably not circular and may for example be square. The pins 58 and the apertures 55 are preferably shaped such that the at least one pin 58 fits within the apertures 55 but also rotates freely for articulation of the belt with a small amount of friction.

The pins 58 extend through the apertures 55 of the outer link 52 on a first side surface 56c of the toothed belt 56, through the toothed belt 56, through the second side surface 56c of the toothed belt 56 and through the apertures 55 of outer link 52 on the second side surface 56c.

Referring to FIGS. 7-10, the height H of the links is greater than the height of the toothed belt 56, such that the outer links 52 of the hybrid chain belt 60 elevate the toothed belt 56 from the sliding surface 72 of the guide or tensioner arm 70 and prevent contact of the toothed belt 56 with the sliding surface 72 of the guide or tensioner arm 70. The elevation of the toothed belt 56 from the sliding surface 72 of the guide or tensioner arm 70 provides low friction engagement of the hybrid chain belt 60 with the sliding surface 72 of the guide or tensioner arm 70.

The addition of the outer links 52 and pins 58 to the toothed belt 56 provides increased tensile strength and enhances the durability of the toothed belt 56. The chain links 52 also elevate the toothed belt 56 above the guide or tensioner arm 70 to prevent contact of the toothed belt 56 with the sliding surface 72 of the guide or tensioner arm 70, commonly made of plastic and provides low friction tensioning system of a chain combined with the low friction engagement and wrapping of a sprocket with a belt.

The outer links 52 are preferably made of metal.

FIGS. 13-18 show a hybrid chain belt of a third embodiment engaging a sliding surface of a tensioner arm or guide. The difference between the hybrid chain belt of the third embodiment in comparison to the second embodiment and the first embodiment is that each outer plate has a single aperture for receiving a pin and an outer plate for each tooth of the toothed belt, and therefore pins are not connected through outer links as in the second embodiment.

The hybrid chain belt 100 comprises a toothed belt 56. The toothed belt 56 contains reinforcing cords (not shown) and is preferably made of rubber, elastomer, or some other material that is compatible with motor oil. The toothed belt 56 has a top surface 56a with teeth 57, a bottom surface 56b, and two identical side surfaces 56c. Extending from a bottom surface 56b of the toothed belt 56 are teeth 57 which extend therefrom. Within each of the teeth 57 of the toothed belt 56 is at least one pin 58. The pins 58 may be overmolded during the manufacturing of the toothed belt 56 or inserted into the teeth 57 of the toothed belt 56 using other techniques. The pins 58 may also be inserted into a keyway present in the teeth 57. The pins 58 may be retained within the teeth 57 of the toothed belt 56 using a knurled pattern, cross-drilled holes or other retention means. It should be noted that while only one pin 58 is shown, multiple pins of varying shapes and sizes may be used within the teeth 57 of the toothed belt 56.

Outer or external plates 82 are mounted to the sides 56c of the belt 56. The outer plates 82 each have a single aperture 83 for receiving at least one pin 58. The pins extend through the apertures 83 of the plate 82 on a first side surface 56c of the belt 56, through the toothed belt 56, through the second side surface 56c of the belt 56 and through the aperture of plate 82 on the second side surface 56c. An outer plate 82 is preferably present for each tooth 57 of the toothed rubber belt 56 with an associated pin(s) 58. The pins 58 are only connected through the toothed belt 56 itself. The pins 58 are fixedly attached to the outer plates 82. A rivet 59 may be present on at least one end of the pin 58 and is preferably square in shape. The pin 58 is preferably not circular and may for example be square. The pins 58 and the apertures 83 are preferably shaped such that the at least one pin 58 fits within the apertures 83 but also rotates freely for articulation of the belt with a small amount of friction.

Referring to FIGS. 13-16, the height H of the plates is greater than the height of the toothed belt 56, such that the outer plates 82 of the hybrid chain belt 100 elevate the toothed belt 56 from the sliding surface 72 of the guide or tensioner arm 70 and prevent contact of the toothed belt 56 with the sliding surface 72 of the guide or tensioner arm 70. The elevation of the toothed belt 56 from the sliding surface 72 of the guide or tensioner arm 70 provides low friction engagement of the hybrid chain belt 100 with the sliding surface 72 of the guide or tensioner arm 70.

FIGS. 19-22 illustrate a hybrid chain belt of a fourth embodiment engaging a sliding surface of a tensioner arm or guide. The difference between the hybrid chain belt of the fourth embodiment and the hybrid chain belt of the third embodiment is that the belt has teeth on both a top and a bottom surface and the pins run through the teeth on only one side of the belt.

The hybrid chain belt 150 comprises a double sided toothed belt 156. While it is possible for the belt to transmit power on both sides of the belt, the main purpose of the teeth on the backside of the belt is to contain a pin 158 for the outer plates. The toothed belt 156 contains reinforcing cords (not shown) and is preferably made of rubber, elastomer, or some other material that is compatible with motor oil. The toothed belt 156 has a first set of teeth 160 along a top surface with each pair of teeth 160a separated by a valley 161 and a second set of teeth 157 extending from bottom surface with each pair of teeth 157a separated by a valley 162. The side surfaces 156a of the belt are identical. The first set of teeth 160 is offset relative to the second set of teeth 157, such that a tooth 160a of the first set of teeth 160 extends from the belt 156 and opposite the tooth 160a is a valley 162. Similarly, a tooth 157a of the second set of teeth 157 is opposite a valley 161. This allows the hybrid chain belt 150 to be guided by the outer plates 182 and potentially eliminate the need for other guidance features within a tensioner system including the hybrid chain belt.

Within each tooth 157a of the second set of teeth 157 of the toothed belt 156 is at least one pin 158. The pins 158 may be overmolded during the manufacturing of the toothed belt 156 or inserted into the teeth 157a of the second set of teeth 157 of the toothed belt 156 using other techniques. The pins 158 may also be inserted into a keyway present in the teeth 157a of the second set of teeth 157. The pins 158 may be retained within the teeth 157a of the second set of teeth 157 of the toothed belt 156 using a knurled pattern, cross-drilled holes or other retention means. It should be noted that while only one pin 158 is shown, multiple pins of varying shapes and sizes may be used within the teeth 157a of the second set of teeth 157 of the toothed belt 156.

Outer or external plates 182 are mounted to the sides 156a of the belt 156. The outer plates 182 each have a single aperture 183 for receiving at least one pin 158. The pins extend through the apertures 183 of the plate 182 on a first side surface 156c of the belt 156, through the toothed belt 156, through the second side surface 156c of the belt 56 and through the aperture 183 of plate 182 on the second side surface 156c. An outer plate 182 is preferably present for each of the teeth 157a of the toothed rubber belt 156 with an associated pin(s) 158. The pins 158 are only connected through the toothed belt 156 itself. The pins 158 are fixedly attached to the outer plates 182. A rivet may be present on at least one end of the pin 158 and is preferably square in shape. The pin 158 is preferably not circular and may for example be square. The pins 158 and the apertures 183 are preferably shaped such that the at least one pin 158 fits within the apertures 183 but also rotates freely for articulation of the belt with a small amount of friction.

Referring to FIG. 19, the height H of the plates 182 is greater than the height h1, h2 of the teeth 157, 160 of the toothed belt 156, such that the outer plates 182 of the hybrid chain belt 150 elevate the toothed belt 156 from the sliding surface 72 of the guide or tensioner arm 70 and prevent contact of the toothed belt 156 with the sliding surface 72 of the guide or tensioner arm 70. The elevation of the toothed belt 156 from the sliding surface 72 of the guide or tensioner arm 70 provides low friction engagement of the hybrid chain belt 156 with the sliding surface 72 of the guide or tensioner arm 70. The outer plates 182 are preferably made of metal.

The addition of the outer plates 182 and pins 158 to the toothed belt 156 results in a hybrid-chain belt in the third and fourth embodiments, which is lighter than a belt system, has the benefit of reducing free-strand belt vibration during engagement with the sprocket, lowering noise, vibration and harshness (NVH). In addition, it allows lower belt tensions to improve system efficiency, maintains belt engagement efficiency and decreases the package size by eliminating the guides from belt pulleys, since the guides are built in to the hybrid chain belt. Furthermore, lower tension on the belt increases the durability of the belt and/or allows the width of the belt to be reduced.

It should also be noted that the term "bottom" as used in FIGS. 19-22 is referring to the side of the belt 156 that is closest to the sliding surface 72 of the tensioner arm or guide.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hybrid chain belt for engagement with teeth of a sprocket comprising:
    a toothed belt having a top surface, a first side surface, a second side surface, a bottom surface, and a plurality of teeth which extend from at least one of the top surface or the bottom surface;
    a plurality of pairs of plates, each pair of plates comprising a plate on the first side surface and a plate on the second side surface of the toothed belt, each plate having at least one aperture; and
    a plurality of pins, each pin extending through the aperture of a plate on the first side surface of the toothed belt, through the toothed belt, through the second side surface of the toothed belt, and through the aperture of a plate on the second side surface of the toothed belt;
    wherein the plurality of plates have a height which is greater than the height of the teeth of the toothed belt such that the plurality of plates engage a sliding surface of a guide or tensioner arm.

2. The hybrid chain belt of claim 1, wherein each pin is fixedly attached to each of the pair of plates.

3. The hybrid chain belt of claim 1, further comprising a rivet attached to ends of each pin.

4. The hybrid chain belt of claim 1, wherein each of the pins is non-circular in shape.

5. The hybrid chain belt of claim 1, wherein the toothed belt has teeth on both the top surface and bottom surface.

6. The hybrid chain belt of claim 1, wherein each tooth in the plurality of teeth has a keyway, and the pin extends through the keyway.

7. The hybrid chain belt of claim 1, wherein each of the plates has two apertures, and spans two pins extending through two teeth.

8. A hybrid chain belt for engagement with teeth of a sprocket comprising:
    a toothed belt having a top surface, a first side surface, a second side surface, a bottom surface, and a plurality of teeth which extend from at least one of the top surface or the bottom surface;
    a plurality of pairs of inner links, each pair of inner links comprising an inner link on the first side surface and an inner link on the second side surface of the toothed belt, each inner link having a pair of apertures;
    a plurality of pairs of outer links, each pair of outer links comprising an outer link outward from two adjoining inner links on the first side surface and an outer link outward from two adjoining inner links on the second side surface of the toothed belt, each outer link having a pair of apertures, each aperture of the pair of apertures being aligned with an aperture on one of the two adjoining inner links; and
    a plurality of pins, each pin extending through the aperture of an outer link and an inner link on the first side surface of the toothed belt, through a tooth of the toothed belt, through the second side surface of the toothed belt, and through the aperture of an inner link and an outer link on the second side surface of the toothed belt, such that the outer links and inner links form a chain.

9. The hybrid chain belt of claim 8, wherein the plurality of inner links and the plurality of outer links have a height that is greater than the a height of the teeth of the toothed belt, such that the inner links and the outer links engage a sliding surface of a guide or tensioner arm.

10. The hybrid chain belt of claim 8, wherein a height of the teeth of the toothed belt is greater than a height of the inner links and the outer links, such that the teeth of the toothed belt engages a sliding surface of a guide or tensioner arm.

11. The hybrid chain belt of claim 8, wherein the toothed belt has teeth on both the top surface and bottom surface.

12. The hybrid chain belt of claim 8, wherein each tooth in the plurality of teeth has a keyway, and the pin extends through the keyway.

* * * * *